US011491588B2

(12) United States Patent
Dahlberg et al.

(10) Patent No.: US 11,491,588 B2
(45) Date of Patent: Nov. 8, 2022

(54) BRAZING MATERIAL

(71) Applicant: SWEP INTERNATIONAL AB, Landskrona (SE)

(72) Inventors: Tomas Dahlberg, Helsingborg (SE); Niclas Bornegård, Bjärred (SE)

(73) Assignee: SWEP INTERNATIONAL AB, Landskrona (SE)

(*) Notice: Subject to any disclaimer, the term of this patent is extended or adjusted under 35 U.S.C. 154(b) by 730 days.

(21) Appl. No.: 16/470,118

(22) PCT Filed: Dec. 11, 2017

(86) PCT No.: PCT/EP2017/082227
§ 371 (c)(1),
(2) Date: Jun. 14, 2019

(87) PCT Pub. No.: WO2018/108815
PCT Pub. Date: Jun. 21, 2018

(65) Prior Publication Data
US 2019/0375055 A1 Dec. 12, 2019

(30) Foreign Application Priority Data

Dec. 16, 2016 (SE) .................... 1651661-9

(51) Int. Cl.
B23K 35/30 (2006.01)
B23K 35/02 (2006.01)
(Continued)

(52) U.S. Cl.
CPC ........ *B23K 35/3086* (2013.01); *B23K 35/025* (2013.01); *C22C 38/34* (2013.01);
(Continued)

(58) Field of Classification Search
None
See application file for complete search history.

(56) References Cited

U.S. PATENT DOCUMENTS 4,073,639 A    2/1978 Duvall et al.
5,437,737 A    8/1995 Draghi et al.
(Continued)

FOREIGN PATENT DOCUMENTS

JP    4023999 B2    12/2007
SE    1550718 A1    1/2017
(Continued)

OTHER PUBLICATIONS

International Search Report and Written Opinion for PCT/EP2017/082227, dated Feb. 19, 2018.
(Continued)

*Primary Examiner* — Anthony M Liang
(74) *Attorney, Agent, or Firm* — Merchant & Gould P.C.

(57) ABSTRACT

A brazing material for brazing a brazed plate heat exchanger comprising a number of heat exchanger plates being provided with a pressed pattern of ridges and grooves adapted to provide contact points between neighbouring heat exchanger plates, such that the heat exchanger plates are kept on a distance from one another and such that interplate flow channels for media to exchange heat are formed between the heat exchanger plates comprises a brazing alloy comprising at least one melting point depressing element and metals resembling the composition of the heat exchanger plates. The brazing material comprises a mixture between grains of a melting brazing material having solidus and liquidus temperatures lower than a brazing temperature and a non-melting brazing material having solidus and liquidus temperatures above the brazing temperature. The ratio between the melting and non-melting brazing materials is such that an alloy formed by the melting and non-melting brazing materials has a solidus temperature lower than the brazing temperature and a liquidus temperature higher than the brazing temperature.

8 Claims, 3 Drawing Sheets

(51) Int. Cl.
*C22C 38/58* (2006.01)
*C22C 38/54* (2006.01)
*C22C 38/44* (2006.01)
*C22C 38/34* (2006.01)
*B23K 101/14* (2006.01)

(52) U.S. Cl.
CPC .............. *C22C 38/44* (2013.01); *C22C 38/54* (2013.01); *C22C 38/58* (2013.01); *B23K 2101/14* (2018.08)

(56) References Cited

U.S. PATENT DOCUMENTS

| | | |
|---|---|---|
| 7,789,288 B1 | 9/2010 | Johnson et al. |
| 2014/0220376 A1 | 8/2014 | Schick et al. |
| 2016/0184935 A1 | 6/2016 | Sjödin |

FOREIGN PATENT DOCUMENTS

| | | |
|---|---|---|
| WO | 2008060225 A1 | 5/2008 |
| WO | WO 2015/006338 A1 | 1/2015 |
| WO | WO 2015/062992 A1 | 5/2015 |
| WO | WO 2016/055430 A1 | 4/2016 |
| WO | 2016/116273 A1 | 7/2016 |
| WO | WO 2016/193383 | 12/2016 |
| WO | WO 2016/193383 A1 | 12/2016 |

OTHER PUBLICATIONS

Japanese Office Action for JP Application No. 2019-530664 dated Aug. 27, 2021 (6 pages).
Melting temperature ranges for stainless steels—British Stainless Steel Association retrieved May 29, 2019 https://www.bssa.org.uk/topics.php?article=103.
Stainless Steel 316/316L—Global Metals, www.globalmetals.com.au.
European Communication for EP Application No. 17822594.2 dated Jul. 22, 2021 (7 pages).

BRAZING MATERIAL

This application is a National Stage Application of PCT/EP2017/082227, filed 11 Dec. 2017, which claims the benefit of priority to Swedish Patent Application No. 1651661-6, filed 16 Dec. 2016, which applications are incorporated herein by reference. To the extent appropriate, a claim of priority is made to each of the above disclosed applications.

TECHNICAL FIELD

The present invention relates to a brazing material for brazing a brazed plate heat exchanger comprising a number of heat exchanger plates provided with a pressed pattern of ridges and grooves adapted to provide contact points between neighbouring heat exchanger plates, such that the heat exchanger plates are kept on a distance from one another and such that interplate flow channels for media to exchange heat are formed between the heat exchanger plates. The brazing material comprises a brazing alloy comprising at least one melting point depressing element and metals resembling the composition of the heat exchanger plates.

PRIOR ART

In the art of brazing, one or more materials are joined to one another by applying a brazing material onto contact surfaces of the materials to be joined. Thereafter, the temperature of the materials to be joined and the brazing material is increased to a temperature wherein the brazing material is melted whereas the materials to be joined are not.

In the field of brazed plate heat exchangers, the most common base materials and brazing materials are stainless steel and copper, respectively. This material combination is very beneficial in many ways, but in some cases, it cannot be used. For example, in some countries, it is prohibited to use copper in tap water applications, and if ammonia is used as a refrigerant, copper is excluded due to copper forming water soluble complexes in the presence of copper and ammonia.

For applications where copper cannot be used, nickel can be used as a brazing material. Nickel as a brazing material has, however, the drawback of producing brittle brazing joints due to the melting point depressants necessary for lowering the melting temperature of nickel. The melting point depressants are usually Silicon, Boron, Phosphorous or combinations thereof.

Still another option is to use a stainless steel based brazing material, i.e. a stainless steel mixed with melting point depressants such as Silicon, Boron and/or Phosphorous. Using a stainless steel with melting point depressants has, however, the drawback that the melting point depressants tend to migrate into the base material, which will lower the melting point of the base material and hence lead to erosion and "burn-throughs", i.e. a phenomenon caused by the melting point depressants in the brazing material lowering the melting point of the plate material to such an extent that the plate material melts over the entire thickness of the plate, hence causing a hole through the plate of the heat exchanger plates.

A solution to the erosion problems is presented in the patent application SE 1550718-9, filed by the applicant of this application. Here, the amount of melting point depressants is so low that the brazing material does not melt during the brazing. Rather than being joined by the base material and the brazing material being solving into one another during the brazing process, the non-melting brazing material and the base material will be joined by diffusion. The joining method disclosed in SE 1550718-9 is beneficial in that it gives virtually no erosion, but a drawback is that the joint comprising the particles of non-melting brazing material becomes porous. The porosity may in some cases lead to the joint being weak.

It is well known that braze alloys containing a melting point depressant such as Silicon, Boron and/or Phosphorous does not have a single temperature melting point. Rather, such braze alloy has a melting temperature interval with a lower temperature (the "solidus temperature") where the braze alloy starts to melt and a higher temperature (the "liquidus temperature") where the braze alloy is completely melted.

It is the object of the present invention to provide a brazing material that gives a brazing joint having low or no porosity while erosion of base material is low

SUMMARY

The present invention solves, or at least mitigates, the above and other problems by providing a brazing material comprising a blend between grains of a melting brazing material having solidus and liquidus temperatures lower than a brazing temperature and grains of a non-melting brazing material having solidus and liquidus temperatures above the brazing temperature, wherein the ratio between the melting and non-melting brazing materials is such that an alloy formed by the melting and non-melting brazing materials has a solidus temperature lower than the brazing temperature and a liquidus temperature higher than the brazing temperature.

Due to its rapid diffusion rate and high melting point decreasing effect, the melting brazing material grains may comprise boron as a melting point lowering element.

In order to resemble the composition of the heat exchanger plates, the melting brazing material grains may comprise 1.5-3% Mo, 10-15% Ni, 16-20% Cr, 7-10% Si, 5-7% Mn, 1-2% B, balance Fe.

For the same reason, the non-melting brazing material grains may comprise 1.5-3 Mo, 10-15% Ni, 16-20% Cr, 5-7% Si, 5-7% Mn, balance Fe.

In order to exploit the rapid diffusion of Boron, the compositions of the melting and non-melting brazing materials may be identical except for the melting brazing material containing 1-2% Boron.

In order to match a desired brazing temperature, the non-melting brazing material may have a solidus temperature exceeding 1250 degrees C. and the melting brazing material has a liquidus temperature below 1250 degrees C.

In order to reduce erosion of base material while giving a non-porous brazing joint, an alloy formed of the melting and non-melting brazing materials in the proportions of the brazing material may have a solidus temperature lower than 1250 degrees and a liquidus temperature over 1250 degrees C.

BRIEF DESCRIPTION OF THE DRAWINGS

In the following, the invention will be described by reference to the appended drawings, wherein.

DESCRIPTION OF EMBODIMENTS

Figure 1:
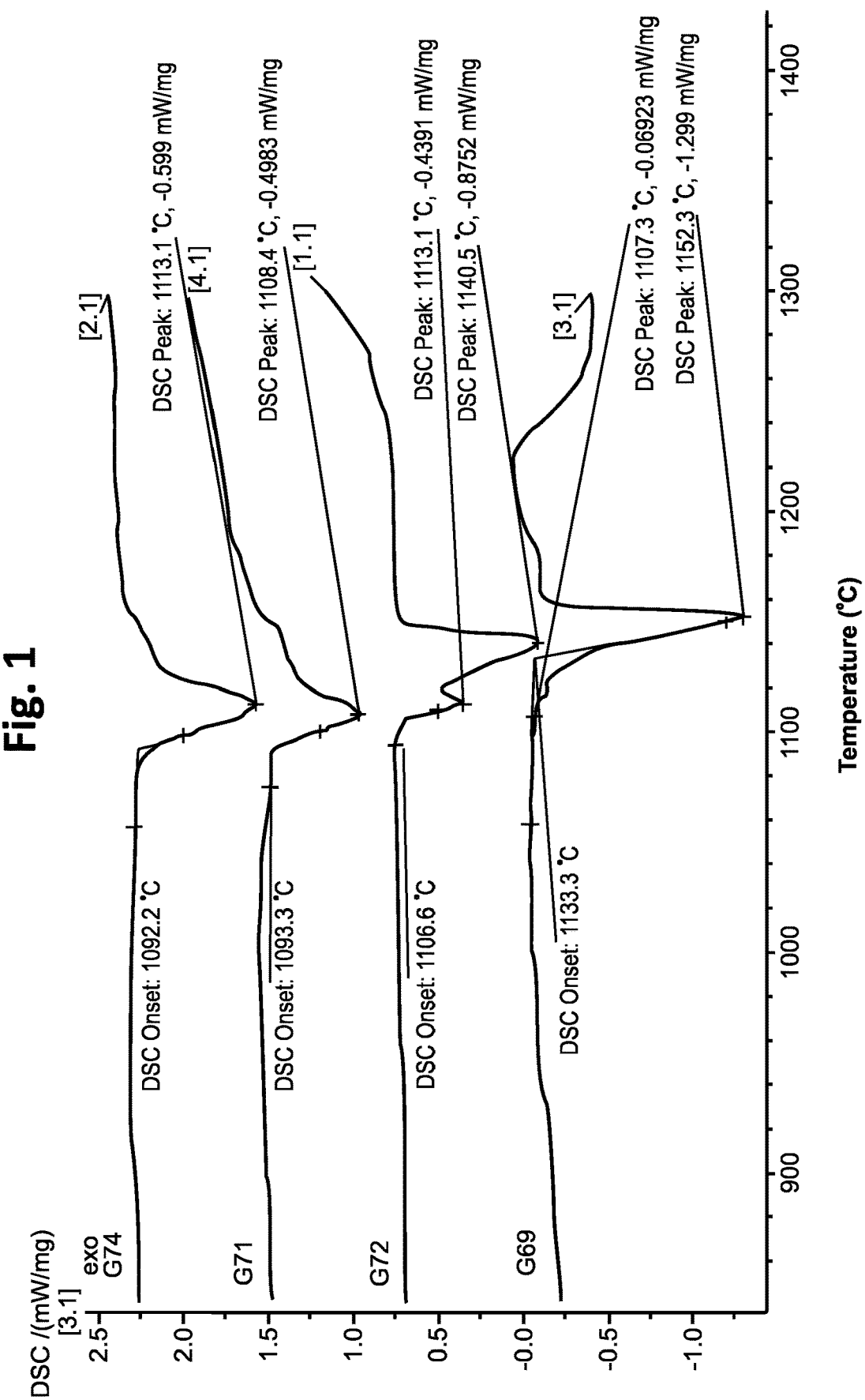
FIG. 1 is a typical DTA-TGA curve for four typical braze alloys comprising one or more melting point depressants.

In FIG. 1, two DSC (Differential Scanning calorimetry) curves for typical brazing alloys comprising one or more melting point lowering elements are shown. In short, a DSC curve represents the difference in the amount of heat required to increase the temperature of a sample and reference is measured as a function of temperature.

With reference to FIG. 1, the upper DSC curve comprises a first segment from 700 degrees to about 1120 degrees C. In this segment, the heat required to heat the sample (in this case a brazing alloy) is rather constant. From about 1120 degrees C. to 1164 degrees C., i.e. a second segment, much more energy is required in order to increase the temperature. This is due to melting of the braze material. From about 1164 degrees C. to about 1180 degrees, i.e. a third segment, the energy required to increase the temperature is going back to about the same value as during the first segment, and in a fourth segment, the brazing material is completely melted and the energy required for increasing the temperature will be constant again.

In order to deduce the so-called solidus and liquidus temperatures from the curves, i.e. the temperatures where all brazing material is in solid state and liquid state, respectively, it is common to translate these temperatures to onset and offset temperatures respectively, wherein the onset temperature is a temperature of a crossing point between a mean tangent of the first segment and a mean tangent of the second segment and wherein the offset temperature is a temperature of a crossing point between a mean tangent of the third segment and a mean tangent of the fourth segment. In the following, the onset and offset temperatures for the DSC curves will be regarded as the solidus and liquidus temperatures of the brazing material.

In the following figures, section photographs of brazing joints will be shown. All of the photographs show brazing joints between crossing ridges and grooves of neighbouring heat exchanger plates. The brazing material has been added in form of a paste comprising solvent, a binder and a powder of brazing alloy.

Figure 2:
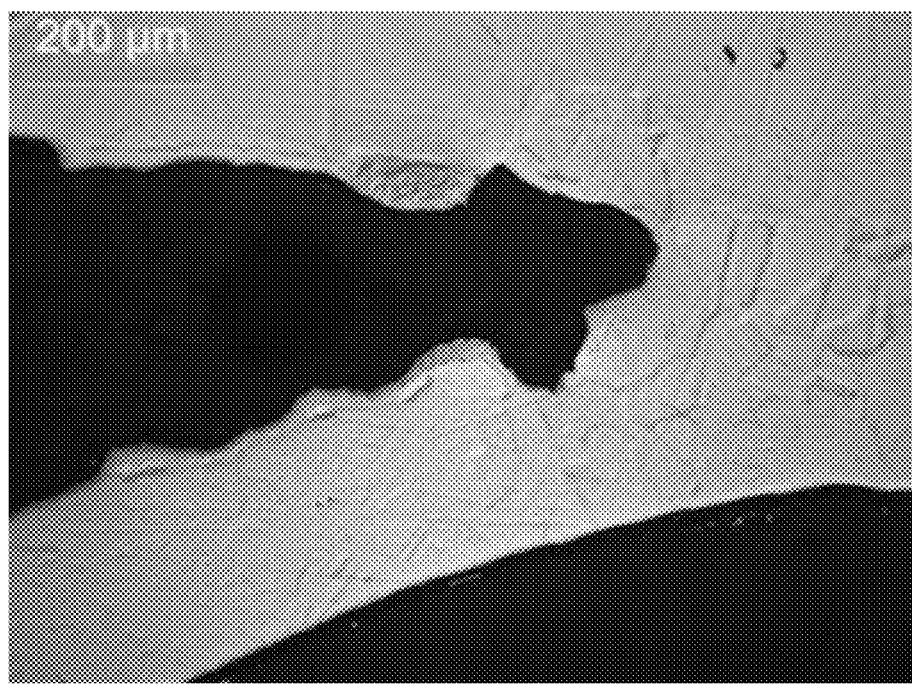
FIG. 2 is a micrography of a polished prior art brazing joint wherein a brazing material having solidus and liquidus temperatures lower than the brazing temperature has been used to join heat exchanger plates.

In FIG. 2, a prior art brazing joint between ridges and grooves of neighbouring heat exchanger plates comprised in a plate heat exchanger is shown. The braze material is an alloy comprising stainless steel and melting point depressants (boron and silicon), and the braze temperature is higher than both the liquidus and solidus temperatures of the brazing material—in other words, the brazing material is completely melted during the brazing. Also, it could be added that the brazing material has been added close to, but not at, the crossing point between the ridges and grooves of neighboring plates, such as disclosed in WO2015/062992A1 by the applicant. As can be seen in FIG. 1, the brazing joint is homogenous (i.e. it comprises no or very few pores). However, at the outskirt of the joint, some erosion of the plate material can be seen. This erosion is due to melting point lowering elements in the braze alloy migrating into the plate material, hence lowering the melting point of the plate material. Hence, the plate material to which the melting point depressing element has migrated might melt and become part of the brazing joint, hence reducing the thickness of the plate material in the vicinity of the brazing joint. In severe cases, the erosion of the plate material might lead to so-called "burn-through", meaning that there will be a hole through the heat exchanger plate. This is, of course, disastrous for a plate heat exchanger, since a hole through a plate will lead to an internal leakage in the heat exchanger.

Figure 3:
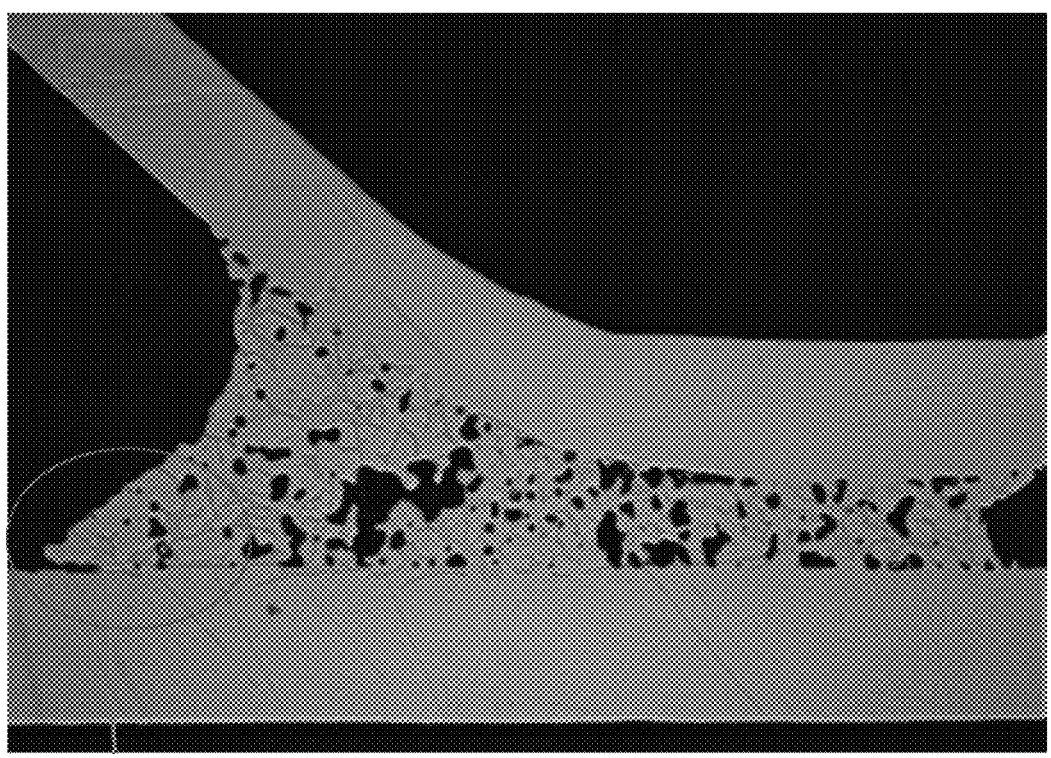
FIG. 3 is a micrography showing a polished prior art brazing joint wherein a brazing material having solidus and liquidus temperatures higher than the brazing temperature has been used.
Figure 4:
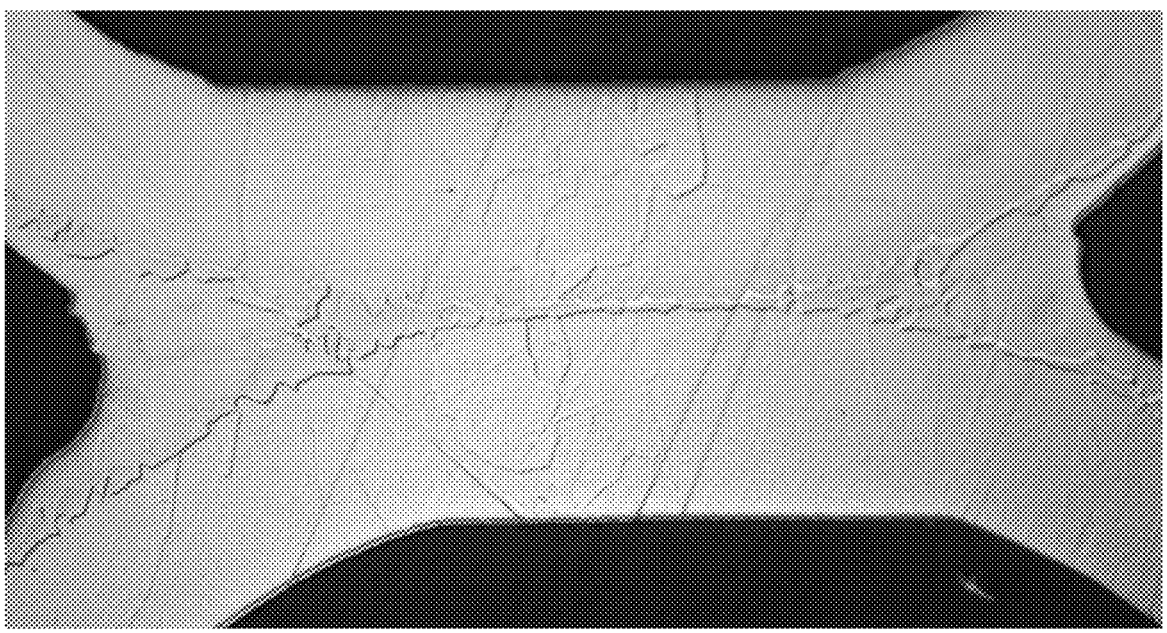
FIG. 4 is a micrography showing a polished brazing joint according to an embodiment of the present invention.

In order to reduce the erosion and burn-through problems with such brazing materials shown in FIG. 2, the applicant has made experiments with a brazing material having solidus and liquidus temperatures that are higher than the brazing temperatures—in other words, the brazing material will not melt during the brazing. Instead of joining the heat exchanger plates by melting and subsequent solidifying, as occurs with the brazing material of FIG. 2, the brazing material having solidus and liquidus temperatures higher than the brazing temperature will join the plates by diffusion. A typical brazing joint achieved by the brazing material having higher liquidus and solidus temperatures than the brazing temperature is shown in FIG. 3. As can be seen in this figure, the brazing joint is completely free from erosion—which is not surprising, since the amount of melting point depressants in the brazing material is not sufficient to enable melting of the brazing material itself. In case some of the melting point lowering elements would migrate into the plate material, the percentage of melting point lowering elements in the plate material also would not be sufficient to melt the plate material. It could be mentioned that, in contrast to FIG. 2, the brazing material has been applied at the contact point between ridges and grooves of neighbouring plates.

It could also be seen that a central portion of the brazing joint is free from pores; the pressure between crossing ridges and grooves of neighbouring plates is sufficient to make particles of the brazing material fuse together and form a pore free joint. In the outskirts of the brazing joint, there are, however, pores.

Tests have shown that the strength of the brazing joints of FIGS. 2 and 3 are about equal in terms of $N/mm^2$, but since the effective, i.e. pore free, joint achieved with the brazing material of FIG. 3 is smaller, the resulting joint strength is lower than for the joints achieved according to FIG. 2. On the other hand, there is no erosion.

As mentioned in the "Summary"-section, it is the object to provide a brazing material giving pore free joints and no or low erosion of the base material, i.e. the plate material.

This is achieved by mixing a powder of a non-melting brazing alloy, i.e. an alloy having higher solidus and liquidus temperature than the brazing temperature, and a melting brazing alloy, i.e. a brazing material having lower liquidus and solidus temperatures than the brazing temperature.

Common for all embodiments is that more than 50% of the brazing alloy (by weight) is a non-melting brazing alloy. Also common for all embodiments is that the brazing material is in form of a paste, and that the paste comprises grains of brazing material, wherein a certain percentage of the grains are manufactured from a melting brazing material and the remainder of the grains are manufactured from non-melting brazing material. Except from the grains of brazing material, the paste also comprises a solvent and a binder serving to form a paste of the grains.

Typical grain sizes for the brazing materials are less than 100 microns. This means that the total surface area of the grains will be many times larger than the surface area of the base material the brazing material covers.

As mentioned earlier, the major problem with melting brazing materials comprising melting point lowering element(s) is that the melting point lowering element(s) tend to migrate into the base material and lower the melting point thereof such that the base material melts, which causes erosion of the base material. The erosion process is very dependent on time—the longer brazing times, the more erosion. According to an embodiment, however, the time available for the melting point lowering elements to migrate into the base material is controlled in an efficient manner: once the melting brazing material has melted, the melting point lowering elements will start to migrate, but since the surface area of the non-melting grains are so much larger than the area of the base material that is in contact with the brazing material, a majority of the melting point depressant will migrate into the non-melting brazing material grains rather than into the base material. Of course, this will lead to "erosion" of the non-melting grains, but it will also lead to the melted brazing material being depleted of brazing material, meaning that when all or a majority of the non-melting brazing material has been "eroded" or dissolved, there will be not enough melting point depressant left in the melted brazing material to migrate into the base material to the extent that the melting point thereof will become lower than the brazing temperature. Hence, erosion of the base material is mainly avoided.

As an example, the non-melting brazing material grains could be made from pure stainless steel of the same type as the base material. However, the best results have been achieved by providing the non-melting brazing material in form of grains made from stainless steel mixed with a small amount of melting point depressing elements. This is probably due to faster depletion/dilution of the melting brazing material.

Tests have shown that a mixture of non-melting brazing material grains comprising (by weight) 2% Mo, 12.5% Ni, 18.2% Cr, 6.3% Si, 5% Mn, balance Fe and melting brazing material grains comprising (by weight) 2.1% Mo, 13.4% Ni, 18.4% Cr, 8% Si, 5.3% Mn, 1.1% B, balance Fe, in the proportions 90-75/10-25 will produce strong and pore free joints giving no or very little erosion of a base material made from 316 stainless steel when brazed at a temperature of 1250 degrees C. under an atmosphere of 1-1.5 mbar inert gas.

The non-melting brazing material according to the above has a solidus temperature of about 1260 degrees C. and a liquidus temperature of about 1370 degrees C., i.e. both the solidus and liquidus temperatures are above the brazing temperature of 1250 degrees C.

The melting brazing material has a solidus temperature of about 1110 degrees C. and a liquidus temperature of about 1195 degrees C., i.e. both the solidus temperature and the liquidus temperatures are lower than the brazing temperature.

Using a simple interpolating procedure, the solidus and liquidus temperatures of an alloy made from brazing material containing 10% melting brazing material and 90% non-melting brazing material according to the above is estimated to have a solidus temperature of 1245 degrees C. and a liquidus temperature of 1352 degrees C., and an alloy comprising 25% melting brazing material and 75% non-melting brazing material is estimated to have a solidus temperature of 1222 degrees C. and a liquidus temperature of 1326 degrees C. In other words, the solidus and liquidus temperatures of both the alloys will be such that the solidus temperature is lower than the brazing temperature and the liquidus temperature is higher than the brazing temperature.

By doing the same interpolation between the solidus and liquidus temperatures of a non-melting brazing material comprising grains of pure stainless steel and melting brazing material according to the above, similar solidus and liquidus temperatures as disclosed above for the resulting alloy (i.e. solidus and liquidus temperatures being lower and higher than the brazing time, respectively) for a melting brazing material content of 27% to 53%.

The time required to form a homogenous alloy from the grains of melting and non-melting brazing material grains is highly dependent on the grain size of, primarily, the non-melting brazing material grains; smaller grains will give shorter time for forming a homogenous alloy.

Using a non-melting brazing material made from stainless steel grains is economically advantageous, since such grains can be bought "off-the-shelf" in various grain sixes, whereas brazing material grains made from melting brazing material can not.

The present invention is particularly for brazing with brazing material comprising melting point depressing elements that can migrate into the base material, for example stainless steel base material brazed with a stainless steel braze material comprising melting point lowering elements in form of Silicon, Boron, Phosphorous and/or Manganese. Of these melting point depressing elements, Boron is the most efficient in terms of melting point lowering effect as a function of percentage, and it is also the element with the fastest diffusion rate into the base material or neighbouring non-melting grains having a lower percentage of Boron. It also tends to form brittle Borides, predominantly with the Chromium in the stainless steel. Except from the Borides being extremely brittle, the formation of Chromium borides "consume" considerable amounts of chromium, which after the formation of boride will not give the corrosion resistance properties it is supposed to. Chromium borides are predominantly formed in the liquid phase, and since the present invention reduces the time the brazing material is in liquid phase, the present invention will reduce the problems with boride formation significantly, hence improving both brazing joint strength and corrosion resistance of the joint.

Silicon and Phosphorous are less efficient melting point lowering elements in terms of melting point lowering effect as a function of percentage. Therefore, larger amounts of these melt depressants are needed, and they are therefore equally problematic in terms of brittle phase formation.

Manganese is a melting point lowering element that except from the melting point lowering effect also provides for a good wetting between the brazing material and the base material. Manganese, however, tends to vaporize during the brazing (especially if the brazing is performed under a vacuum), meaning that the melting temperature of the finished brazing joint might be higher than the initial melting of the brazing material. This is usually no problem, but if unnecessarily large amounts of manganese are used, there might be a problem with brazing furnace fouling.

Preferably, the brazing material is provided in the form of a paste comprising melting and non-melting brazing material particles, a solvent for providing rheological properties to the paste for its application and a binder adapted to keep the brazing material particle together when the solvent has evaporated. However, other possibilities are also possible. As an option, the brazing material may be provided as a green body, i.e. a body comprising powdered melting and non-melting brazing material particles that has been pressurized such that a cold sintering occurs between the particles. It should be noted that, according to the invention, the green body should not be heat treated such that the composition differences of the brazing material grains is equalized prior to the green-body being used as brazing material in the brazing process.

The invention claimed is:

1. Brazing material for brazing a brazed plate heat exchanger comprising a number of heat exchanger plates being provided with a pressed pattern of ridges and grooves adapted to provide contact points between neighboring heat exchanger plates, such that the heat exchanger plates are kept on a distance from one another and such that interplate flow channels for media to exchange heat are formed between the heat exchanger plates, the brazing material comprising a brazing alloy comprising at least one melting point depressing element and metals resembling a composition of the heat exchanger plates, wherein the brazing material comprises a mixture of grains of a melting brazing material having solidus and liquidus temperatures lower than a brazing temperature and a non-melting brazing material having solidus and liquidus temperatures above the brazing temperature, wherein a ratio between the melting and non-melting brazing materials is such that an alloy formed by the melting and non-melting brazing materials has a solidus temperature lower than the brazing temperature and a liquidus temperature higher than the brazing temperature, wherein more than 50% by weight of the brazing alloy is non-melting brazing material, and wherein the non-melting brazing material is made from stainless steel mixed with melting point depressing elements.

2. The brazing material of claim 1, wherein the melting brazing material grains comprise boron as a melting point lowering element.

3. The brazing material of claim 2, wherein the melting brazing material grains comprise 1.5-3% by weight Mo, 10-15% by weight Ni, 16-20% by weight Cr, 7-10% by weight Si, 5-7% by weight Mn, 1-2% by weight B, balance Fe.

4. The brazing material according to claim 1, wherein the non-melting brazing material grains comprise 1.5-3% by weight Mo, 10-15% by weight Ni, 16-20% by weight Cr, 5-7% by weight Si, 5-7% by weight Mn, balance Fe.

5. The brazing material according to claim 1, wherein compositions of the melting and non-melting brazing materials are identical except for the melting brazing material containing 1-2% by weight boron.

6. The brazing material according to claim 1, wherein the non-melting brazing material has a solidus temperature exceeding 1250 degrees C.

7. The brazing material according to claim 1, wherein the melting brazing material has a liquidus temperature below 1250 degrees C.

8. The brazing material according to claim 1, wherein an alloy formed of the melting and non-melting brazing materials in the proportions of the brazing material has a solidus temperature lower than 1250 degrees C. and a liquidus temperature over 1250 degrees C.

* * * * *